Dec. 27, 1932.  S. WIELGUS  1,892,090
HAT SHAPING DEVICE
Filed March 3, 1930  3 Sheets-Sheet 1
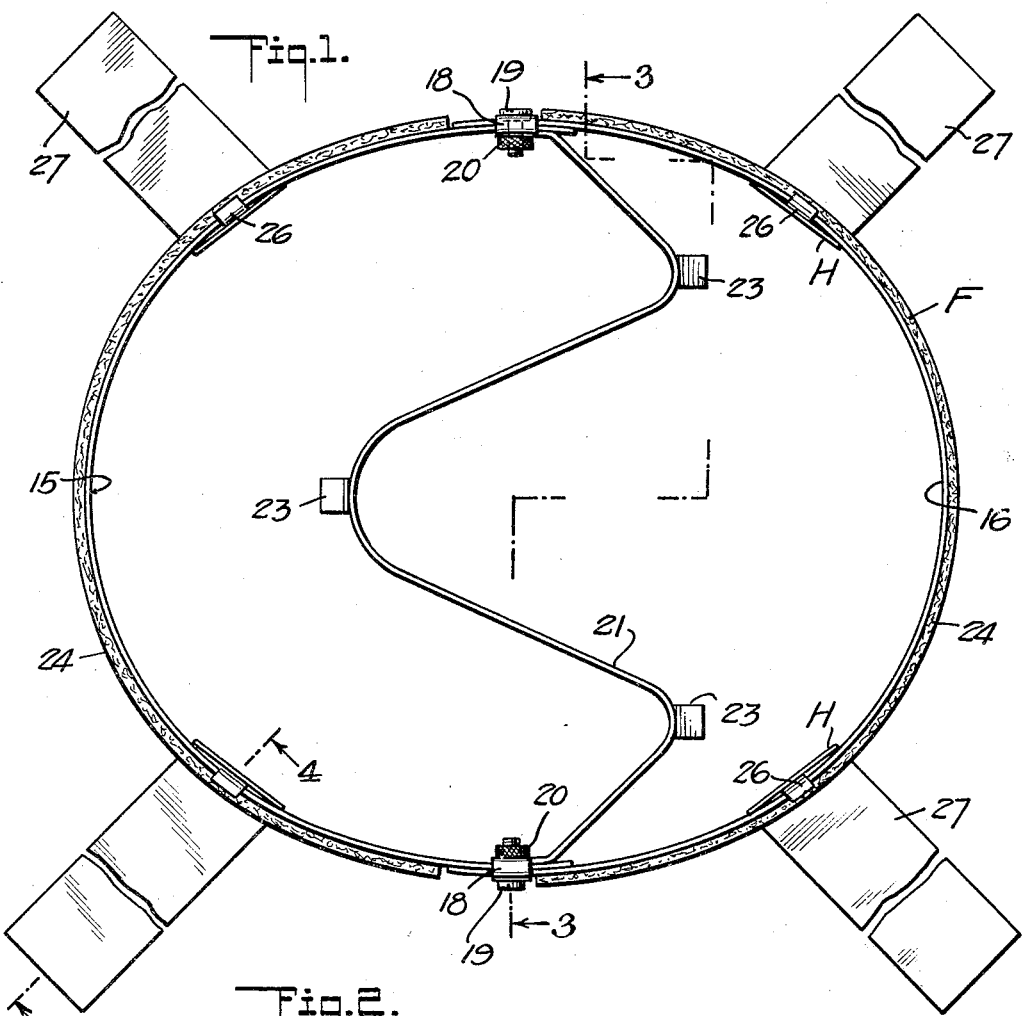
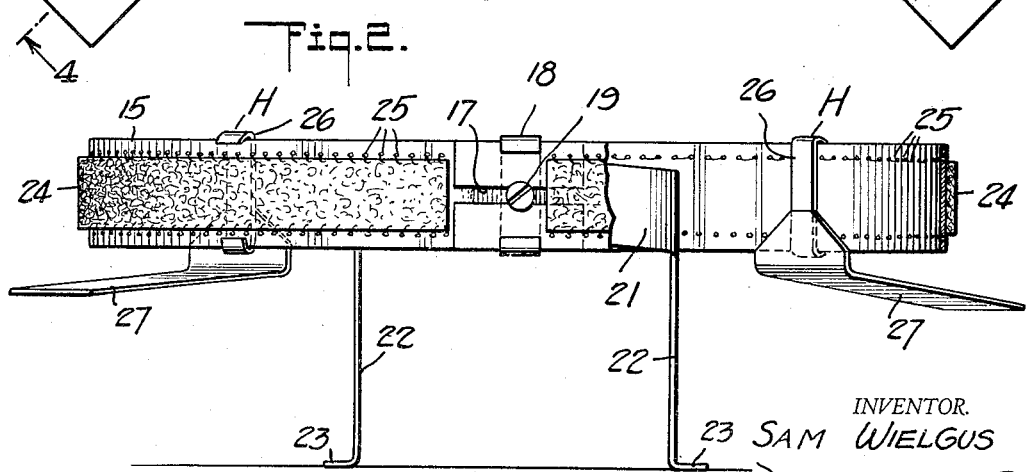
INVENTOR.
SAM WIELGUS
ATTORNEYS.

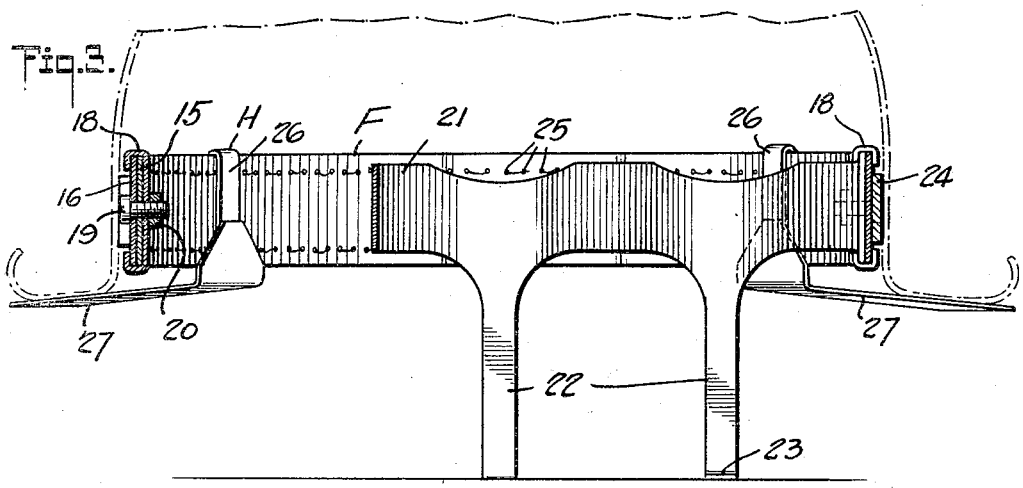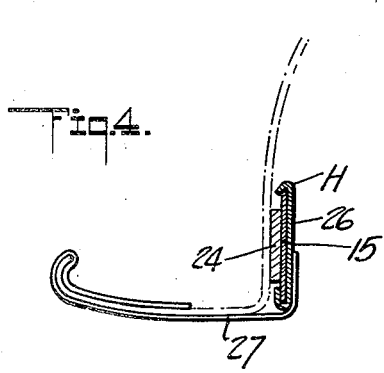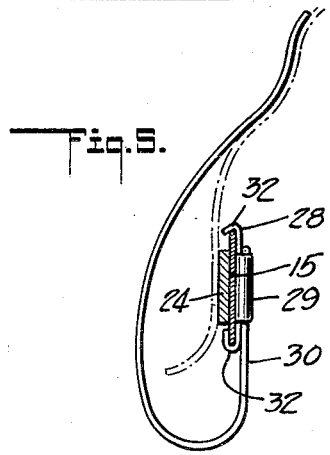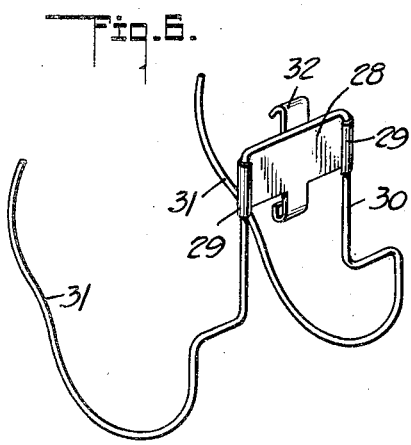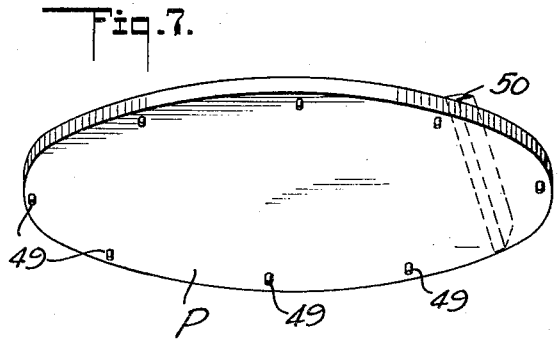

Dec. 27, 1932.  S. WIELGUS  1,892,090
HAT SHAPING DEVICE
Filed March 3, 1930   3 Sheets-Sheet 3
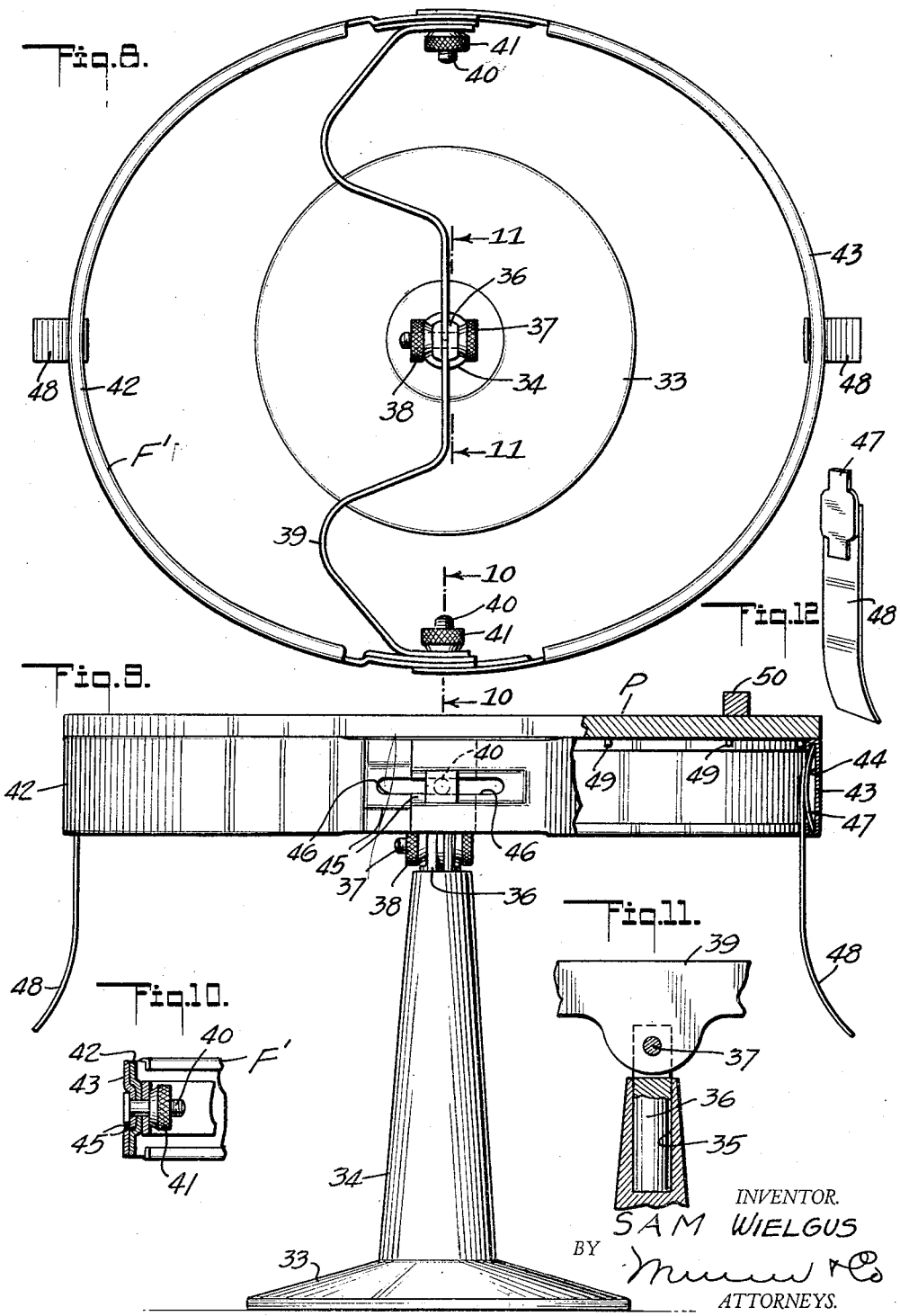
INVENTOR.
SAM WIELGUS
BY
ATTORNEYS.

Patented Dec. 27, 1932

1,892,090

UNITED STATES PATENT OFFICE

SAM WIELGUS, OF PHOENIX, ARIZONA

HAT-SHAPING DEVICE

Application filed March 3, 1930. Serial No. 432,959.

My invention relates to and has for a purpose the provision of a simple, inexpensive, and durable device which is capable of being manipulated by even the layman, to shape or re-shape hats to any form desired, the device being adjustable to treat hats of various sizes and shapes.

It is also a purpose of my invention to provide a hat-shaping device which may be utilized as a display stand for hats and other forms of articles.

I will describe only two forms of hat-shaping device, and one form of attachment for one of the devices for converting it into a display stand, all embodying my invention, and will then point out the novel features thereof in claims.

In the accompanying drawings:

Fig. 1 is a view showing in top plan one form of hat-shaping device embodying my invention.

Fig. 2 is a view showing the device of Fig. 1 in side elevation and with a portion of the crown supporting frame broken away.

Fig. 3 is a vertical sectional view taken on the line 3—3 of Fig. 1.

Fig. 4 is a sectional view taken on the line 4—4 of Fig. 1.

Fig. 5 is a view similar to Fig. 4 showing a crown shaping member applied to the hat supporting frame.

Fig. 6 is a detail perspective view of the members shown in Fig. 5.

Fig. 7 is a view showing in perspective one form of article support adapted to be associated with the device shown in Fig. 8.

Fig. 8 is a view similar to Fig. 1 showing another form of hat-shaping device embodying my invention.

Fig. 9 is a view similar to Fig. 2 and of the device shown in Fig. 8.

Figs. 10 and 11 are vertical sectional views taken on the lines 10—10 and 11—11, respectively, of Fig. 8.

Fig. 12 is a detail perspective view of one of the brim holding elements shown in Fig. 9.

Similar reference characters refer to similar parts in each of the several views.

Referring specifically to the drawings, and to the form of device illustrated in Figs. 1, 2, and 3, my invention in this embodiment comprises a frame designated generally at F, and which, in its normal form is substantially ovate that it may conform generally to the shape of the average head. This frame is formed of metal or any other material which is capable of being readily bent in order that when applied to the head it may be caused to accurately conform to the shape of the head even to the point of snugly fitting the undulations of the human skull. In the present instance, the frame is made up of two arcuate sections 15 and 16, the ends of which are disposed in overlapped relation and formed with longitudinally extending slots 17, as best shown in Fig. 2. Brackets 18 embrace the overlapped ends of the frame sections, and through the slots 17 and the brackets 18 a pair of screws 19 extend, the inner ends of the screws carrying knurled nuts 20 by which the screws may be manipulated to clamp the overlapped ends of the frame sections to the brackets 18. By this construction, it will be evident that the frame sections are capable of adjustment relatively to increase or decrease the total area of the frame, and to maintain any such adjustment in order that the frame as a whole may be adjusted to hats of various head sizes.

The brackets 18 are fixed on the ends of a support designed for the purpose of supporting the hat frame F in elevated position, and the construction of this support is such as to permit any adjustment of which the frame F is capable to cause it to conform to the size and shape of a head. The support is shown as comprising a length of bendable metal 21 of zig zag form, and supporting legs 22 secured to the member 21 with the lower ends of the legs bent at right angles to provide feet 23. By means of these legs and feet the member 21 is supported in horizontal position, and with the member 21 connected to the frame F through the medium of the clips 18, the frame F may be supported in elevated position. The construction of the member 21 is such that it may be hung on a nail or other wall projection to support the frame is vertical position on the wall and to thereby support a hat in corresponding position in place of utilizing the legs 22 to support the frame in elevated position on the horizontal support.

In the applied position of the frame F to a hat, it is adapted to be inserted into the hat crown so as to contact with the sweat band of the hat, in the instance of a man's hat, but in the instance of a woman's hat, it will engage the crown adjacent the bottom edge thereof. To protect the hat against possible injury by the frame F, strips of felt 24 are secured to the outer sides of the frame sections 15 and 16 by means of stitching, the frame sections being perforated as indicated at 25 to receive the threads.

The frame F is primarily designed to shape a hat crown as to head size and precise contour of the head, but to support and shape any hat provided with a brim, I employ a plurality of brim-holding members H. As these members are identical in construction, a description of one will suffice for all. Each brim holding member comprises a resilient clip 26 of the form shown in Fig. 4, and which has secured thereto an elongated plate 27 of bendable metal. As applied to the frame F, the clip 26 embraces one frame section 15 or the other 16 and in such manner as to permit adjustment of the clip longitudinally or circumferentially on the frame. The plate 27 depends from the clip and extends exteriorly of the area defined by the frame F in order that it may be disposed beneath the brim of a hat, as illustrated in Fig. 3, to support said brim, or it may be bent, as illustrated in Fig. 4, to embrace a hat brim of any cross sectional contour and so as to fix this contour. It will be understood that the plate 27 may be bent to conform to the normal contour of the hat brim or to establish a new contour. Also, the plates 27 are capable of being bent to assume any position within a radius of 360°, it being clear that such adjustment of the plates is rendered possible by reason of the elevated position of the frame which is supported by the legs 22. As will be understood from a consideration of Fig. 4, the plates 27 can be bent inwardly and upwardly to assume a position at the inner side of a hat supported on the frame F in order that it may contact with the crown of the hat for shaping the latter from the interior thereof. Thus, it will be understood that by bending some of the plates to the position just described, and others outwardly to embrace the outer side of the crown of the hat, that the several plates may be caused to coact in embracing the crown of a hat to maintain the latter in a predetermined contour.

In the case of the present day women's sport hats, which in most instances have little or no brim, I employ a member of the construction illustrated in Figs. 5 and 6, the function of which is to shape the crown of the hat while it is supported upon the frame F. In the present instance, this member comprises an elongated plate 28, the ends of which are curled to form resilient sleeves 29 to yieldingly embrace a U-shaped wire frame 30, the ends of the frame being extended to form arms 31. The plate 29 carries a clip 32 which is adapted to embrace the frame F in the same manner as the clip 26, and to thereby hold the member as a unit on the frame, in the manner illustrated in Fig. 5. The arms 31 are bendable to assume any shape desired, and as illustrated in Fig. 5, they are adapted to be bent upwardly to contact with the outer side of a hat crown so as to hold the hat crown in the shape to which the arms are bent. However, in addition the arms 31 may be lengthened or shortened to suit any particular position in respect to the shaping of a hat, by pulling the wire in either direction through the resilient sleeves 29, as it will be understood that the sleeves will yield to permit the wire to slide therethrough.

In actual practice, the frame F of the hat shaping device is first detached from the support, the brim holding elements from the frame, and the frame sections 15 and 16 from each other. The frame sections may now be separately applied to the head, one around the front part of the head and the other around the rear part of the head, each being separately shaped to the respective parts of the head to accurately conform to the contour thereof. Once this has been accomplished, the frame sections are again connected and the frame is inserted into a hat of the approximate size of the head to which the frame was fitted, the frame being inserted into the crown of the hat adjacent the brim thereof. In this manner the hat may be stretched and otherwise shaped to accurately conform to the size and contour of the head to which the frame has been adjusted, it being understood that the hat is to remain upon the frame for a period sufficient to effect the proper shaping thereof.

Prior to inserting the frame into the hat, the support embodying the member 21 and the legs 22 is applied to the frame by means of the clips 18, the nuts 20 of the bolts 19 being manipulated to fixedly secure the clips to the frame and to hold the frame sections in the previous position of adjustment. Thus, when the hat is applied, it is supported in elevated position upon the frame F and in such manner that the frame is free to shape the hat in accordance with the contour defined by the bending and adjustment of the frame sections.

If it is desired to support the brim of a hat to prevent it from losing its original shape, or to re-shape the brim, one or more of the brim-holding elements may be employed in the manner previously described. It will of course be understood that the brim-holders are applied to the frame F before the frame is placed within the hat.

Should it be desired to preserve the original shape of the crown of the hat or to re-shape such crown, one or more of the elements shown in Figs. 5 and 6 may be employed in the manner previously described, and in addition to having elements with arms 31 extending exteriorly of the frame F and then upwardly, as is herein illustrated, the position of these elements may be reversed so that the arms extend upwardly within the area defined by the frame F to project into the crown of the hat for engagement with the inner side thereof. Such form of shaping elements may be used alone or in conjunction with the exterior elements and to the end of preserving or establishing a predetermined shape of the crown.

Referring now to Figs. 8 to 12 inclusive, I have here shown another form of hat-shaping device which possesses the additional advantage of providing various forms of adjustment in order that the hat supporting frame can be supported at various inclinations, for the purpose of displaying the hat, while at the same time, its original shape is preserved, or a new shape given.

In this embodiment of my invention, I provide a pedestal including a base 33, a standard 34 rising from and fixed to the base and provided at its upper end with a pocket 35 in which a pin 36 is rotatably received. The upper end of this pin is bifurcated, with two of its sides flattened, as best illustrated in Fig. 8. Through the bifurcated end a bolt 37 extends provided with a nut 38, the inner sides of the bolt-head and nut engaging the flat sides of the pin. A connecting frame is adapted to the pin 36 by extending the intermediate portion of the frame through the bifurcated end of the pin and then passing the bolt 37 through the pin and through the frame, there being formed in the frame, a suitable opening for this purpose. By virtue of this connection, the connecting frame is supported for adjustment about the bolt 37 as a center in order that additional adjustments of the hat supporting frame may be obtained, as will be clear as the description proceeds.

The connecting frame is indicated at 39, and comprises a strip of metal which may be bendable to increase or decrease its overall length in order that it may accommodate itself to variations in adjustment of the hat supporting frame. In the normal form of the connecting frame, it is shaped as illustrated in Fig. 8, although it may assume other forms as will be understood. The opposite ends of the frame are connected to a hat supporting frame designated generally at F' and similar in construction to the first form of hat-shaping device. By means of bolts 40 and nuts 41, the ends of the frame 39 are connected to the frame F', this form of connection permitting adjustment of the frame F' about the bolts 40 as a center. It will be noted that the bolts 40 are disposed at right angles to the bolts 37, and consequently one may secure adjustments of the frame F' on the connecting frame 39 not attainable by adjustment of the frame 39 on the bolt 37. Thus the frame F' is capable of two major adjustments about two different axes, and thereby attaining the various positions of adjustment necessary to support and display a hat at any desired angle.

The frame F' is likewise formed of two arcuate sections 42 and 43 capable of being adjusted relatively to increase its size to suit hats of different sizes, and these sections may be made of bendable matter as is the frame F, but in the present instance, I have shown the sections made of strips of metal having their marginal edges bent inwardly to provide a channel 44 at the inner sides thereof. The end portions of the sections are indented as indicated at 45, and formed with slots 46 to receive the bolts 40, the heads of the bolts being flush with the outer surface of the frame by reason of the fact that they are disposed within the indented portions 45. It will be understood that through the medium of the bolts and slots the sections 42 and 43 can be adjusted to vary the size of the frame. Such adjustment does not interfere with movement of the frame F' about the bolts 40 as a center, so that the various angular adjustments of the frame may be accomplished irrespective of the size to which the frame is adjusted.

The channels 44 of the frame sections 42 and 43 are designed for the reception of spring tongues 47, as illustrated in Fig. 9, and these tongues constitute part of brim-holding members, the remainder of the members being made up of plates 48 secured to the tongues and of a bendable material so that they may be employed in the same manner as the plates 27.

If it is desired to employ the hat shaping device shown in Fig. 7 as a stand for displaying other articles than hats, a filler plate P may be employed to span the frame F' so that articles may be placed on the plate and supported by the frame. As shown in Fig. 7, this plate corresponds in contour with that of the frame F' but is larger than the latter in order that when placed thereon, its edges will project beyond the frame. Pins, screws, or the like, indicated at 49, may be employed to secure the plate against edgewise displacement from the frame, these pins being fixed on the plate so as to engage the inner sides of the frame. A strip 50 is secured to the upper side of the plate P in order to function as an abutment for preventing articles slipping from the plate when the latter occupies an angular position. By reason of the possible adjustments of the frame F' on the connecting frame 39, and the latter on the standard, it should be manifest that the plate can be supported in various positions of adjustment to display articles at any desired angle.

Although I have herein shown and described only two forms of hat-shaping device, and one form of attachment for one of the devices for converting it into a display stand embodying my invention, it is to be understood that various changes and modifications may be made herein without departing from the spirit of the invention and the spirit and scope of the appended claims.

I claim:

1. A hat-shaping device comprising a frame adapted to be inserted into the crown of a hat for maintaining the hat crown in a predetermined form, and brim shaping members carried by the frame and bendable into various shapes about the hat brim to embrace and hold the hat brim in a predetermined form.

2. A hat-shaping device comprising a hat-crown-shaping-frame conformable to the shape of a head, and means on the frame for supporting the latter in elevated position, said means being bendable to compensate for variation in form of the frame and yet function as a support for the frame.

3. A hat-shaping device as embodied in claim 2 wherein means are mounted on the frame bendable to conform to the transverse contour of a hat brim and positioned on the frame to support a hat brim.

4. In a hat-shaping device, a crown-supporting-frame, a clip adjustable on the frame, and an element carried by the clip and bendable to conform to and support the brim of a hat.

5. In combination, a standard, a frame on the standard, a member removably supported on and spanning the frame to provide a support for articles to be displayed, and means on the member engaging the inner side of the frame to secure the member against edgewise displacement from the frame.

6. A hat shaping device comprising a frame of two arcuate sections of bendable material, connectors for the sections to permit adjustment thereof relatively, and a support of bendable material of zig-zag form, said support being connected to the frame by said connectors.

7. A hat shaping device comprising a frame of two arcuate sections of bendable material, connectors for the sections to permit adjustment thereof relatively, a support of bendable material of zig-zag form, said support being connected to the frame by said connectors, and brim shaping and supporting members adjustable along the frame and having parts bendable to engage and hold a hat brim in a predetermined shape.

SAM WIELGUS.